June 15, 1943.  W. S. TANDLER ET AL  2,321,874
ROBOT VEHICLE
Filed Sept. 7, 1940  3 Sheets-Sheet 1

INVENTOR
WILLIAM S. TANDLER
PAUL M. MAZUR
BY
ATTORNEY

June 15, 1943.    W. S. TANDLER ET AL    2,321,874
ROBOT VEHICLE
Filed Sept. 7, 1940    3 Sheets-Sheet 2

INVENTOR
William S. Tandler
Paul M. Mazur.
BY
Hoguet Neary & Campbell
ATTORNEY

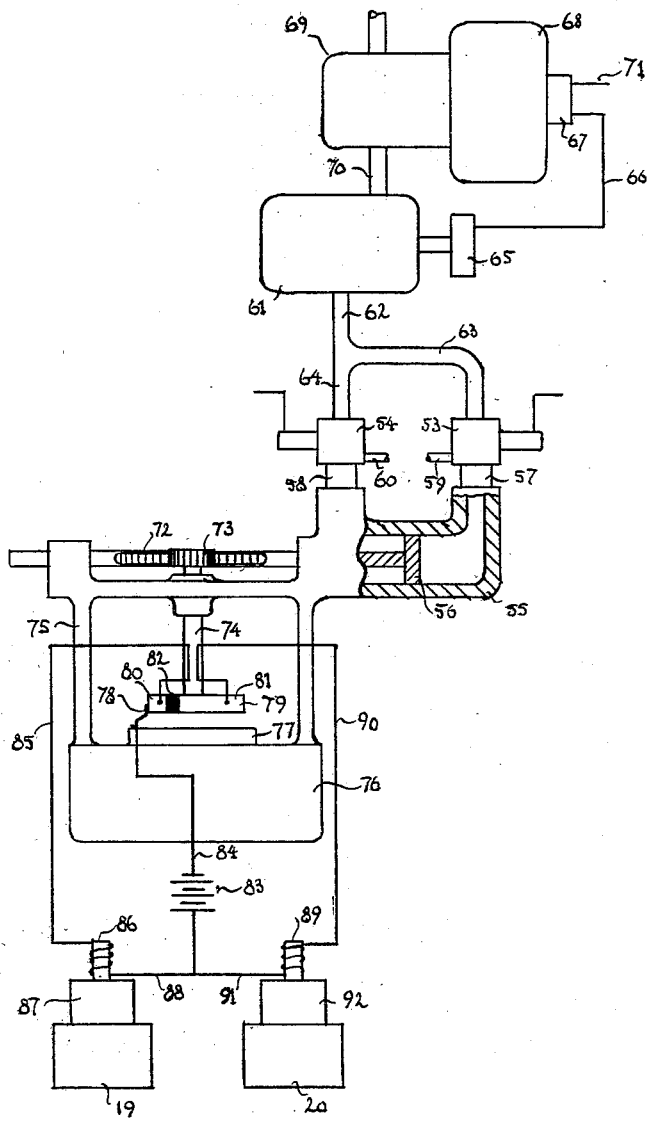

Patented June 15, 1943

2,321,874

UNITED STATES PATENT OFFICE 2,321,874

ROBOT VEHICLE

William S. Tandler and Paul M. Mazur, New York, N. Y., assignors to Industrial Scientific Corporation, New York, N. Y., a corporation of New York Application September 7, 1940, Serial No. 355,750

8 Claims. (Cl. 180—79.1)

The present invention relates to dirigible vehicles and embodies, more specifically, a dirigible vehicle wherein means is incorporated to operate the same automatically.

More particularly, the invention relates to automatically operated dirigible vehicles wherein the operating mechanism effects a predetermined sequence or course of operation without the necessity of manual supervision during such operation.

We are aware that mechanisms have heretofore been provided to effect the automatic operation of vehicles, particularly automatic operation wherein the vehicle is remotely controlled. The present invention, however, embodies an improved operating mechanism and control therefor by means of which a vehicle may be operated completely automatically over a predetermined course or through a predetermined sequence of operations, and wherein means is incorporated to insure the accurate discharge of each operation by the vehicle regardless of exterior forces that may be exerted thereon to tend to vary the predetermined operation.

An object of the invention, accordingly, is to provide a dirigible vehicle wherein means is incorporated to effect the operation thereof automatically and over a predetermined course or sequence of operations.

A further object of the invention is to provide a vehicle of the above character wherein the aforesaid operating mechanism is characterized by an ability to direct the sequence of operations regardless of the existence of external forces that tend to divert the course of operations from the predetermined one.

A further object of the invention is to provide a vehicle of the above character wherein the operating mechanism is constructed in such fashion that the size, weight, cost, stability and other characteristics are greatly improved over similar vehicles now available.

The foregoing objects and advantages, as well as others that will be appreciated on reading the more detailed description herein, are attained by the provision of a vehicle operating mechanism that is controlled by a predetermined control element which, when used with the control mechanism, causes the predetermined operations to be carried out in an effective and highly improved fashion. This control mechanism is so constructed as to exert positive directing forces upon the vehicle for a predetermined time to effect a desired operation, rather than utilizing two opposing forces which, in acting in opposition, maintain the vehicle on a desired course. The resulting mechanism accomplishes a direct operation rather than a hunting, waving or variable operation that is characteristic of controls utilizing forces in opposition.

The more perfect attainment of the invention is accomplished by utilizing, in combination with the above control mechanism, a supervisory or pilot mechanism in the form of a compass, the indexing of which may be varied in accordance with a predetermined sequence of operations effecting the course of the vehicle, thus avoiding the disturbing effect of external forces that may be exerted upon the vehicle from time to time.

In the herein contained description of the invention, it will be described in connection with its application to armored tanks, although it will be readily apparent that the invention will be applicable to other installations which need not be described specifically herein.

The many advantages accruing from the use of the present invention need not be enumerated herein as they will be readily apparent to those familiar with this particular art. Accordingly, this invention will now be described in greater detail in connection with the accompanying drawings, wherein:

Fig. 4 is a diagrammatic illustration of a supervisory or pilot mechanism to be used with the mechanism shown in Fig. 3 and to assure a desired sequence of operations.

Figure 1:
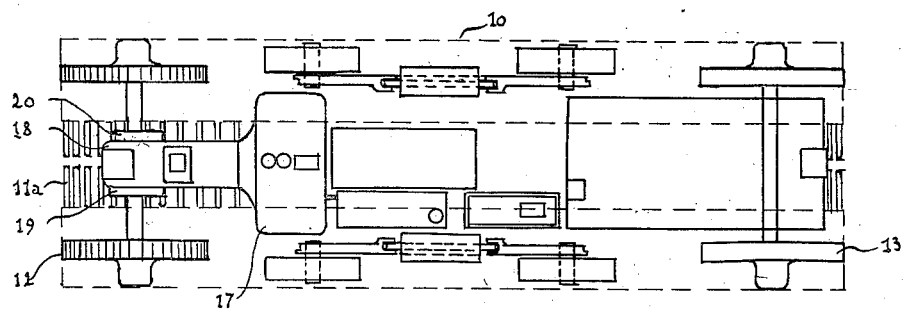
Fig. 1 is a diagrammatic plan view of a dirigible vehicle constructed to be used in connection with the accompanying invention.
Figure 2:
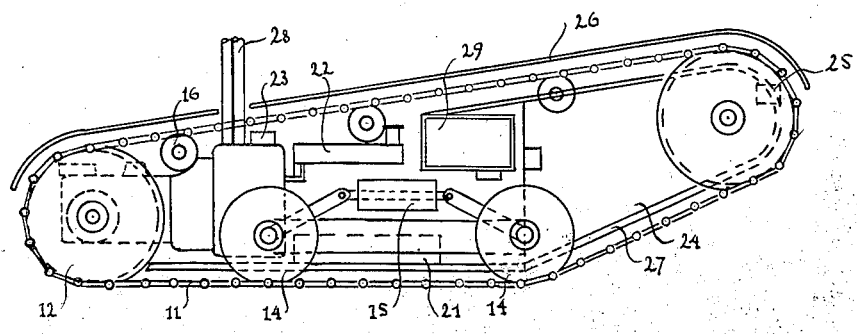
Fig. 2 is a diagrammatic view in side elevation, showing the elements of the device shown in Fig. 1.

Referring to Figs. 1 and 2, a tank is illustrated at 10 and is provided with two endless tracks 11, supported by rear driving wheels 12 and forward idler wheels 13. The bottom courses of the tracks are sustained by suspension wheels 14 that are urged into a normal position by means of a spring suspension box 15. The top courses of the tracks are supported by idler rollers 16, all in accordance with standard practice. The tracks 11 may extend substantially the entire width of the vehicle as shown particularly in Fig. 1, and may be provided with inwardly projecting rods 11a which further support the vehicle and permit it to travel over substantially any type of obstacle. Inasmuch as there are no occupants of the tank, observation superstructure may be omitted entirely and the size of the tank decreased to minimum in width, length and height.

The driving wheels 12 are driven by means of an engine 17 through a differential gear mechanism 18 and right and left steering clutches or brakes 19 and 20, respectively. The battery may be mounted as shown at 21 and the gas tank at 22, a starting ignition and accelerator device being shown at 23, all in accordance with standard practice. Explosives or other instrumentalities may be mounted at the forward end of the tank as indicated at 24, a fuse box or other element 25 being provided as necessary. The top armor 26 and bottom armor 27 may be designed and provided in accordance with the requirements of service but, it is to be observed, the weight of this armor is considerably less than that ordinarily required.

Since there are no human occupants of the tank, it is constructed to be watertight and provided with a tower 28 through which both intake and exhaust gases pass. In this fashion, the tank can go through water up to the depth of the tower.

In order that the tank may be effectively controlled, a control mechanism 29 is mounted in a well protected part of the tank and will now be described in greater detail.

Figure 3:
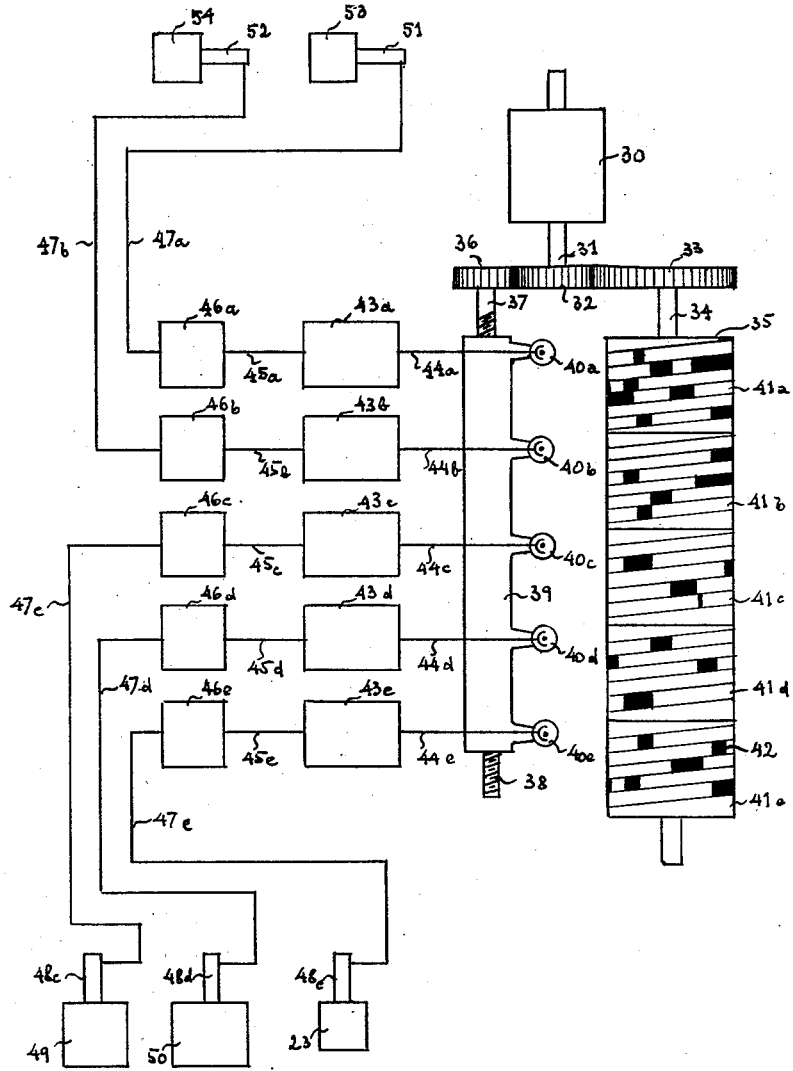
Fig. 3 is a diagrammatic illustration of a control mechanism constructed in accordance with the present invention.

Referring to Fig. 3, a clock or odometer or other suitable power supply mechanism is shown at 30, driving a shaft 31 and gear 32. Gear 32 drives a gear 33, mounted upon a shaft 34 and carrying a drum 35.

Gear 32 also drives a gear 36 mounted upon a shaft 37, formed with a screw thread 38. Upon the threaded shaft 37, a nut 39 is received, the nut being elongated and carrying a plurality of photoelectric cells such as cells 40a, 40b, 40c, 40d and 40e. The nut 39 is mounted so that it can partake only of axial movement with respect to shaft 37 and thus, upon rotation of the shaft 37, the nut advances in the appropriate direction along the shaft.

Upon the drum 35, segments 41a, 41b, 41c, 41d and 41e are formed, each segment being formed with indicia 42 arranged in spiral formation and preferably with a pitch equal to the pitch of the thread 38. The indicia is formed to actuate the respective photoelectric cells mounted on the nut 39 and preferably takes the form of light reflecting and non-reflecting portions of such length and spacing that the respective photoelectric cells will be energized in a desired fashion.

The respective photoelectric cells 40a, 40b, 40c, 40d and 40e are connected to amplifiers 43a, 43b, 43c, 43d and 43e by means of wires 44a, 44b, 44c, 44d, and 44e, respectively, and by means of wires 45a, 45b, 45c, 45d, and 45e to the respective relays 46a, 46b, 46c, 46d and 46e.

The amplifying mechanism and circuits actuated by the respective photoelectric cells may follow any of the many mechanisms now available for such purpose and the specific construction thereof forms no part of the present invention. Similarly, the relays 46a, 46b, 46c, 46d and 46e are of standard construction and require no further description herein.

The relay 46c is connected by means of a wire 47c to a solenoid 48c, for the purpose of controlling, for example, the main engine clutch 49 for connecting or disconnecting the engine 17 from the differential mechanism 18. A wire 47d is provided to connect the relay 46d to a solenoid coil 48d which may control fuses or other instrumentalities 50. Likewise, a wire 47e connects the relay 46e to a solenoid coil 48e to operate the engine accelerator 23, hereinabove referred to.

In order that the course of the tank may be controlled effectively, the relays 46a and 46b are connected by means of wires 47a and 47b to solenoids 51 and 52, respectively. Solenoid 51 controls a valve 53 while solenoid 52 controls a valve 54.

As will be observed in Fig. 4, the valves 53 and 54 control the flow of a fluid into a cylinder 55. A piston 56 is movable in the cylinder and is adapted to be moved in either direction by the admission of fluid through the respective pipes 57 and 58. Discharge pipes 59 and 60 are provided at the respective valves 53 and 54 so that the fluid trapped on either side of the piston may be released to permit proper operation of the piston. In this connection, the valves 53 and 54 are normally held in position to permit the discharge of fluid from the cylinder 55 but, when actuated, serve to shut off such discharge and connect the respective pipes 57 and 58 with a source of fluid under pressure, contained in a reservoir 61. This fluid is applied to the respective valves 53 and 54 by means of a pipe 62 and branch pipes 63 and 64, respectively.

The fluid pressure within the reservoir 61 is controlled by means of a pressure responsive mechanism 65 connected by means of wires 66 with a control switch 67 that operates a motor 68 and pump 69. The pump 69, through a connection 70, maintains a predetermined desired pressure within the reservoir 61 in a manner which will be readily understood. A source of electricity 71 is provided for the control mechanism including the elements 65, 66 and 67, as well as for providing current for driving the motor 68. The piston 56 is connected to a rack 72 that drives a pinion 73, mounted upon a shaft 74. The rack 72 and shaft 74 are carried upon a frame 75 above a gyro compass 76. The gyro compass operates a card 77 carrying a brush contact 78 that engages the periphery of a disc 79 that is fixed to the lower end of the shaft 74. The periphery of the disc 79 is formed with two symmetrical contact surfaces 80 and 81, separated by non-conducting segments 82. The brush contact 78 is connected to a battery or other source of electricity 83 by means of a wire 84 and the conducting segment 80 is connected, by means of a wire 85, to a solenoid 86. This solenoid 86 operates the right brake 19 of the tank through any suitable control mechanism such as a pneumatic valve 87. The solenoid 86 is connected to the battery 83 by means of a lead 88. In like manner, the segment 81 is connected to a solenoid 89 by means of a wire 90 and the solenoid 89 is connected to the battery 83 by means of a lead 91. The solenoid 89 is adapted to actuate the left brake 20 through a suitable mechanism 92 in a fashion similar to that described in connection with the right brake 19.

From the foregoing, it will be observed that, if the vehicle should deviate from a course in a given direction, the brush 78 will move off of the non-conducting segment 82 and engage either of the segments 80 or 81. This will energize either of the respective solenoids 89 or 86 to actuate the respective left or right brakes 19 or 20 to bring the vehicle back to its proper course.

Since the indexing of the non-conducting segment 82 can be effected by turning the disc 79 by means of the shaft 74 and pinion 73, the vehicle can be caused to follow any desired course as predetermined by the indicia on the drum 35. For example, energization of the photoelectric cell 40a by the drum segment 41a and indicia thereon causes the valve 53 to be actuated to introduce fluid into the right hand end of the cylinder 55. This causes the piston 56 to be moved to the left as viewed in Fig. 4 to rotate the shaft 74 and the disc 79 and to cause the segment 82 to be moved to the right as viewed in Fig. 4. This causes the energization of the right brake 19 to cause the vehicle to be turned to the right. The degree of turn thus depends upon the extent of movement of the piston 56 which, in turn, is dependent upon the length of time that the valve 53 is maintained open and, accordingly, upon the length of time that the photoelectric cell 40a is energized. A similar operation results from energization of the photoelectric cell 40b and need not be described specifically in view of the foregoing.

While in the preferred embodiment of the invention, as described above, the gyro compass is used to control the direction of movement of the tank, it is possible to omit the cylinder 55, piston 56, valves 53 and 54, the gyrocompass 76 and associated contacts and connect the wires 47a and 47b directly to the brake control solenoids 86 and 89, thus making the brakes 19 and 20 directly responsive to chart, the amount of turning of the tank being directly proportional to the length of markings on the chart.

While the invention has been described particularly with respect to one form of vehicle, it will be understood that it is equally applicable to other types of vehicles and therefore the form of the invention disclosed should be considered as illustrative and not as limiting the scope of the following claims.

We claim:

1. Control means for a vehicle having a plurality of operating elements comprising separate electro-responsive means for actuating the respective elements, a circuit for each of the said electro-responsive means, a photoelectric device for controlling each of the said circuits, separate indicia means to control each of the said photoelectric devices, a compass, and means actuated by the compass to control said circuits.

2. Control means for a vehicle having operating elements adapted to change the course of the vehicle either to the right or left, comprising separate electro-responsive means for actuating the respective elements, a circuit for each of the said electro-responsive means, photoelectric devices for controlling the respective circuits, a compass, and means actuated by the compass to control said circuits.

3. Control means for a vehicle having operating elements adapted to change the course of the vehicle either to the right or left, comprising separate electro-responsive means for actuating the respective elements, a circuit for each of the said electro-responsive means, conducting segments in each of said circuits spaced by a non-conducting segment, a contact common to each circuit and adapted to engage normally said non-conducting segment and, upon movement with respect thereto in either direction to engage the respective conducting segments, photoelectric devices for controlling the respective circuits, a compass having a movable direction indicating element, and means to mount the contact on the last named movable element.

4. Control means for a vehicle having operating elements adapted to change the course of the vehicle either to the right or left, comprising separate electro-responsive means for actuating the respective elements, a circuit for each of said electro-responsive means, relatively movable contacts in the said circuits, a compass to control the relative positions of the contacts, and photoelectric mechanism for controlling the relative positions of the contacts.

5. Control means for a vehicle having operating elements adapted to change the course of the vehicle either to the right or left, comprising separate electro-responsive means for actuating the respective elements, a circuit for each of said electro-responsive means, relatively movable contacts in the said circuits, a compass for moving one of the said contacts in response to change of direction of said vehicle, and photoelectric mechanism for moving the other of the said contacts.

6. Control means for a vehicle having operating elements adapted to change the course of the vehicle either to the right or left, comprising separate electro-responsive means for actuating the respective elements, a circuit for each of said electro-responsive means, relatively movable contacts in the said circuits, a compass for moving one of the said contacts in response to change of direction of said vehicle, an element movable in opposite directions for moving the other of the said contacts, separate means to actuate the movable element, photoelectric devices for the respective separate means, and circuits energized by the last named devices for controlling the said separate means.

7. Control means for a vehicle having operating elements adapted to change the course of the vehicle either to the right or left, comprising separate electro-responsive means for actuating the respective elements, a circuit for each of said electro-responsive means, relatively movable contacts in the said circuits, a compass for moving one of the said contacts in response to change of direction of said vehicle, a fluid operated element movable in opposite directions for moving the other of the said contacts, a source of fluid pressure, electro-responsive means to direct fluid pressure from said source selectively in opposite directions to actuate the fluid operated element, photoelectric devices for actuating the electro-responsive means, and circuits energized by the last named devices for controlling the said electro-responsive means.

8. Control means for a vehicle having operating elements adapted to change the course of the vehicle either to the right or left, comprising separate electro-responsive means for actuating the respective elements, a circuit for each of said electro-responsive means, relatively movable contacts in the said circuits, a compass for moving one of the said contacts in response to change of direction of said vehicle, a fluid operated element movable in opposite directions for moving the other of the said contacts, a source of fluid pressure, means to maintain said source under constant pressure, electro-responsive means to direct fluid pressure from said source selectively in opposite directions to actuate the fluid operated element, photoelectric devices for actuating the electro-responsive means, and circuits energized by the last named devices for controlling the said electro-responsive means.

WILLIAM S. TANDLER.
PAUL M. MAZUR.